United States Patent [19]
Lewandowski et al.

[11] Patent Number: 5,149,594
[45] Date of Patent: Sep. 22, 1992

[54] METHOD FOR CUTTING AND POSITIONING DOUGH IN A PAN

[75] Inventors: Daniel J. Lewandowski; James R. Evans, both of Burnsville; Randall D. Jessup, Vadnais Heights, all of Minn.

[73] Assignee: The Pillsbury Company, Minneapolis, Minn.

[21] Appl. No.: 830,544

[22] Filed: Jan. 31, 1992

Related U.S. Application Data

[63] Continuation of Ser. No. 521,134, May 9, 1990, abandoned.

[51] Int. Cl.⁵ .............................. A21D 10/02
[52] U.S. Cl. .................................... 426/503; 425/289; 425/296; 425/306; 425/310; 425/313; 425/373; 426/496
[58] Field of Search ................ 426/496, 503; 425/289, 425/296, 373, 310, 311, 308, 306, 307, 313

[56] References Cited

U.S. PATENT DOCUMENTS

| | | | |
|---|---|---|---|
| 2,526,811 | 10/1950 | Dawson | 426/503 |
| 4,170,659 | 10/1979 | Totino et al. | 426/95 |
| 4,464,405 | 8/1984 | DeChristopher | 426/391 |
| 4,539,213 | 9/1985 | Cherkasky et al. | 426/503 |
| 4,696,823 | 9/1987 | DeChristopher | 426/496 |

OTHER PUBLICATIONS

M. C. Larkin, "Pizza Line Produces 100,000 Bases on Half-Mile Baking and Decorating Line," from *Baking Industry*, Mar. 1984.

*Primary Examiner*—Jeanette Hunter
*Assistant Examiner*—Helen Pratt
*Attorney, Agent, or Firm*—Kinney & Lange

[57] ABSTRACT

A method for cutting a sheet of dough and delivering a cut dough portion to a surface of a pan. A cutting ring having a cutting edge is positioned on an upper surface of a pan. A sheet of dough above at least a surface of the pan is pressed against the upper cutting edge to fall onto the dough receiving surface.

15 Claims, 4 Drawing Sheets

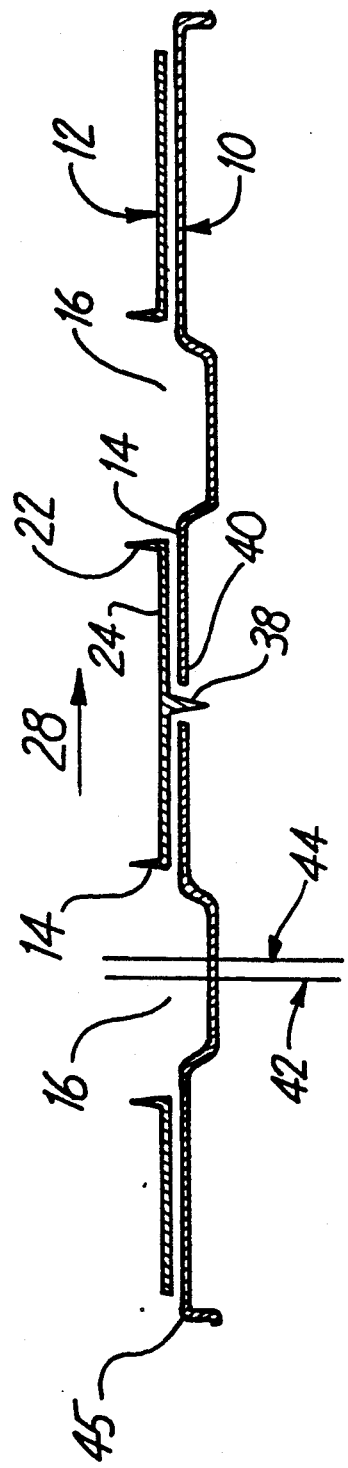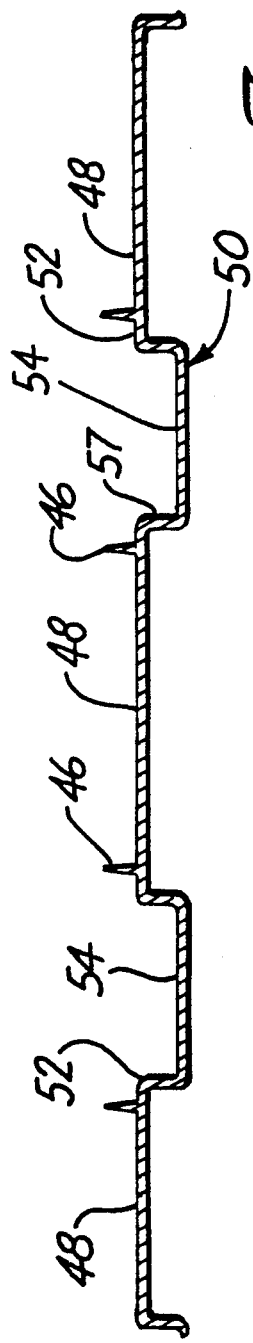

METHOD FOR CUTTING AND POSITIONING DOUGH IN A PAN

BACKGROUND OF THE INVENTION

The present invention relates generally to an apparatus and method for shaping dough. In particular, it relates to an apparatus and method for cutting a sheet of dough and positioning the cut portion in a pan.

A wide variety of processes are known for forming dough for use in the manufacture of baked goods. Commercially baked goods are commonly produced in large quantities, and are manufactured on a production line. Examples of dough-based baked goods which are formed on a production line include pizza crust, pie crusts, pastries, breads, rolls, and cookies.

There are many known commercial processes for shaping dough. Two of them are particularly suitable for shaping elastic doughs, such as pizza dough. The first process is known as pressing, and the second process is known as sheeting and/or die cutting.

The first process (pressing) includes forming dough into small segments, and using a press to compress and form the dough in a mold. The dough may be formed into either a substantially flat shape, or a more complex, three dimensional shape. Pressing can be used to handle a wide variety of doughs, such as pastry dough, for example. This type of process is not as suitable for processing doughs which are elastic—which tend to have snap back characteristics.

"Snap back" for purposes of this disclosure is a characteristic of dough which is caused by the elasticity of the dough. After stretching, the dough retracts somewhat. For example, when shaping pizza dough by hand, it is common to toss the flattened dough in the air, and cause the disc shaped dough to spin in order to aid in stretching the dough. When the stretched dough is placed in the pan, the overall diameter shrinks, or snaps back.

The second process, known in the art as sheeting, is used in processing doughs having more elastic characteristics. A wide variety of pizza doughs, for example, bread-type pizza doughs are commonly processed by sheeting. Although the sheeting process is used in a wide variety of applications, known processes for forming pizza dough will be described as examples of the sheeting process.

One known process of sheeting pizza dough includes the steps of placing the formed dough on a continuous conveyor belt, and passing the dough through a series of rollers. The rollers transform the dough into a continuous strip, having a uniform thickness and width. The rollers may have a smooth outer surface, or may have an irregular outer surface. Optionally, rollers may be used to knead the dough in a direction transverse to the direction of travel of the conveyor belt. The sheet is sent through a series of rollers, each roller flattening the sheet into a wider, thinner sheet.

After the sheet of dough is rolled into a continuous strip, the dough may pass through a preproofer to increase the strength of the sheet. Preproofing involves exposing the sheet to an elevated temperature and a high humidity environment for a period of time sufficient to change the characteristics of the dough, such as making the dough sheet stronger. The strengthened sheet is next cut by passing the sheet beneath a cutting roller.

The cut portions of the dough, and the waste dough remain on a first conveyor belt during the cutting step. A second conveyor belt lifts the waste dough off of the first conveyor belt, and the cut and now separated portions remain on the first conveyor belt.

The cut portions either remain on the belt during further processing, or may be removed and placed in a container such as a pan for further processing steps. On the belt or in the pan, the cut portions may be proofed if previously preproofed, or fed directly into an oven. If proofing is desired, the conveyor belt containing the cut portions passes through a proofer having an elevated temperature and high humidity environment, where the leavening and/or yeast in the cut pieces acts on the dough. The humidity level, temperature and dwell time of the dough in the proofer in large part determine the ultimate characteristics of the cooked crust.

The cut portions alone or the cut portions in pans are transferred onto another conveyor, which feeds into an oven for either partial or complete baking. Alternatively, the proofed portions may be delivered to a fryer for deep fat frying.

Another known method of forming a baked pizza crust includes cutting the sheet of dough with a cutting roller, removing the waste dough from the conveyor, removing each cut portion from the conveyor and dropping each cut portion of dough into a pan. This procedure is commonly used when the dough is to be baked in a pan, or when it is desirable to form a baked product with an upstanding outer edge.

When cutting dough formed by sheeting, it is known in the art to alter the shape of the cutting edge to compensate for tension or snap back in the sheet of dough. For example, with an elastic dough such as pizza dough, the cutting edge used for forming a circular pizza crust must be oval. That is, the cut portion must be slightly longer in the direction of travel of the conveyor to compensate for tension in the dough sheet.

In the process now under discussion, a first conveyor transports the cut portions toward the pan. Beneath the first conveyor is a second conveyor which delivers the pans. A sensing device positions the cut portion above the cavity of the pan. There are many known means of positioning a cut portion above a pan. One type of device employs the use of electronic sensors. As the pan approaches, a first electric eye finds a selected location of the cavity in the pan. A second electric eye finds the selected location of the cut portion.

The cut portion is transferred to a nose conveyor which retracts as the cut portion advances toward the leading edge of the nose conveyor. The electronic eye which senses the position of the cut portion retracts the nose conveyor when the second sensor indicates that the pan is beneath the cut portion.

The speed of the conveyor belt, the accuracy and time delay of the sensors, and the placement of the nose bar, are among the variables which determine whether the dough is ultimately centered in the cavity of the pan. Accuracy of placement using the described method is low, and adjustments to the position of dough in the pan without tearing or distorting the dough is difficult. Inaccurate placement in the pan results in waste and in a higher ratio of recycled dough to fresh dough fed into the process.

When forming products such as a deep dish pizza crust having a thick, upstanding outer edge, pans with at least one cavity having substantially vertical, or frustaconical sidewalls are used. Inaccurate placement of the dough in such a pan results in a product which is typically unacceptable to the consumer. The crust may be very upstanding and thick along one edge, and substantially flat at the opposite edge. This type of crust may also exceed the maximum product height, and not fit into the product packaging. A less critical defect occurs with a crust having an outer edge of varying height. In this case, the product is less uniform in appearance, and is perceived by customers to be of a lower quality, as compared to the quality of pizza crusts having edges of a uniform height.

Of course, if the pan is substantially flat, the placement of the cut portions is less critical.

Another known method of placing sheeted dough in a pan is to drape the sheet of dough over the pan, and pass the pan below one or more cutting rollers. The pan and draped sheet pass under a cutting roller that rolls across and is in contact with the upper edge of the pan. The uppermost edge of the pan in combination with the cutting roller severs the sheet of dough, and the cut portion of the dough falls directly into the pan. Although this method centers the cut portion accurately in the pan, the method does not adequately compensate for tension in the dough, and therefore the dough shrinks (snaps back) in the dimension parallel to the direction of travel of the conveyor. For example, when draping dough and cutting the dough over a round pan, the dough snaps back after cutting, forming a finished crust having an oval shape which is undesirable.

In addition to the above, cutting the dough with the upper edges of the pan is not desirable when manufacturing products with thicker and more upstanding outer edges, such as a deep dish pizza crust, or a pie crust. After the dough is cut along the upper edges of the pan, the dough relaxes, and the edges contract. If the dough is highly elastic, or has a high degree of tension, the cut portion shrinks, and the edges do not extend upward along the sidewalls of the cavity in the pan. The cooked product lacks an upstanding, thick outer edge. A similar result is obtained with any dough and essentially perpendicular pan sidewalls.

If the dough is less elastic, or the tension has been reduced, the edges of the dough may extend only partially up the sidewalls of the cavity. The cooked product in this case has a smaller outer edge, and a more flat overall profile than if the dough were cut into a portion larger than the area defined by upper edge of the pan. A similar result is obtained when the sidewall of the pan cavity is sharply angled.

SUMMARY OF THE INVENTION

The present invention is an apparatus for cutting a formed sheet of dough, and placing the cut portion into the cavity of a pan. A method of cutting a sheet of dough and positioning the cut portion in the pan cavity is also disclosed. The apparatus includes a pan having a surface for receiving cut dough. The apparatus also includes a cutting ring for positioning above the upper surface of the pan. The apparatus of the present invention also includes a device for fixing the relative position of the pan and the cutting ring so as to accurately position the cut portion in the pan cavity. The method is applicable to all types of dough capable of being formed into a sheet, and is most useful in handling doughs having elastic properties, such as pizza dough, for example.

The method of the present invention includes positioning a cutting ring having a cutting edge above and in a selected relation to a surface of a pan, placing a sheet of dough over at least the surface of the pan, and cutting the sheet of dough with the cutting edge such that a cut portion is formed, and placed onto the dough receiving surface of the pan. The cutting edge is of a size and shape to deliver cut dough which is formed into a dough-based product of a selected shape.

BRIEF DESCRIPTION OF THE DRAWINGS

FIG. 4 is a cross-sectional view of a preferred embodiment of the template, removably mounted on a pan, both as taken along lines 4—4 in FIGS. 2 and 3 and when assembled as illustrated in FIG. 1.

FIG. 5 is a cross-sectional view of another preferred embodiment of a template, integrally formed with a pan, taken along a line identical to line 4—4 as shown in FIGS. 2 and 3.

DETAILED DESCRIPTION OF THE PREFERRED EMBODIMENTS

The present invention provides an apparatus for cutting a sheet of dough, positioning a cut dough portion onto a surface of a pan, and a method of doing the same.

Figure 1:
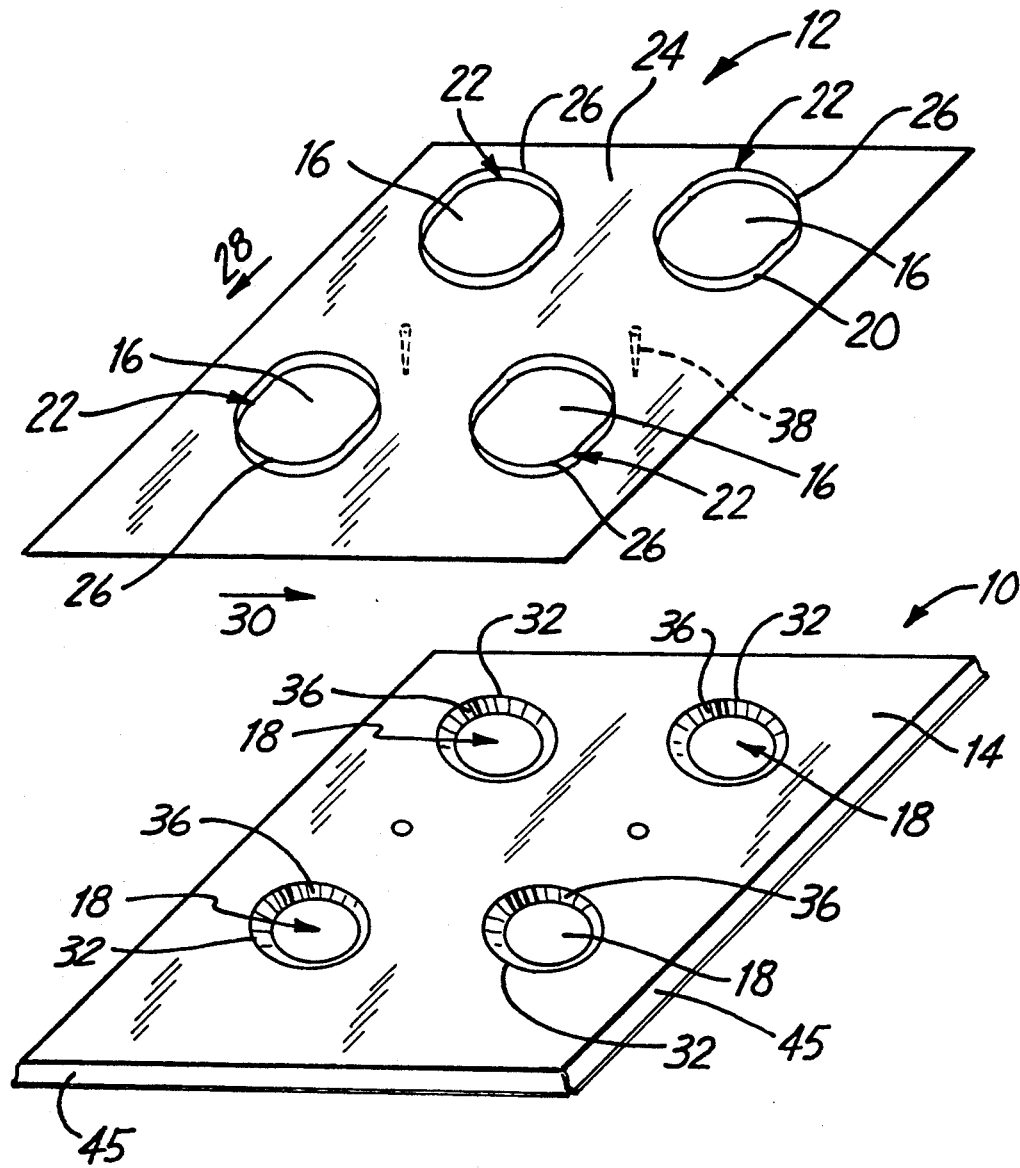
FIG. 1 is an exploded perspective view of a preferred embodiment of an apparatus in accordance with the present invention.

An exploded perspective view of an apparatus in accordance with the present invention is shown in FIG. 1 and includes a pan 10, and a template 12 for mounting onto an upper surface 14 of the pan 10. The template 12 has four spaced openings 16 for allowing a cut portion of dough (not shown) to fall into cavities 18 which in the illustrated embodiment are recesses extending from the upper surface 14 of the pan 10. Meeting the outer edge 20 of each opening 16 in the template 12 is a cutting ring 22 which in a preferred embodiment is carried by the upper surface 24 of the template, and is positioned substantially perpendicular to that surface 24. The ring 22 may be secured to the upper surface 24 in any known manner, as by welding, or may be an integral part of the template 12, for example.

The openings 16 in the template 12 are substantially oval in shape. The cutting ring 22 is also substantially oval, the upper edge defining a cutting edge 26 for severing the sheet of dough. The wall of the cutting ring 22 is substantially smooth, and the cutting edge 26 is substantially planar and sharp. Preferably, the cutting edge 26 is bevelled.

The shape of the opening 16 is determined by the elasticity and tension in the sheet of dough, and the desired shape of the baked or fried dough product. The shape of the cavity of the pan is also selected to help shape the product. The illustrated template 12 is used for processing a sheet of dough having more tension in the direction of arrow 28 than in the direction of arrow 30.

Figure 2:
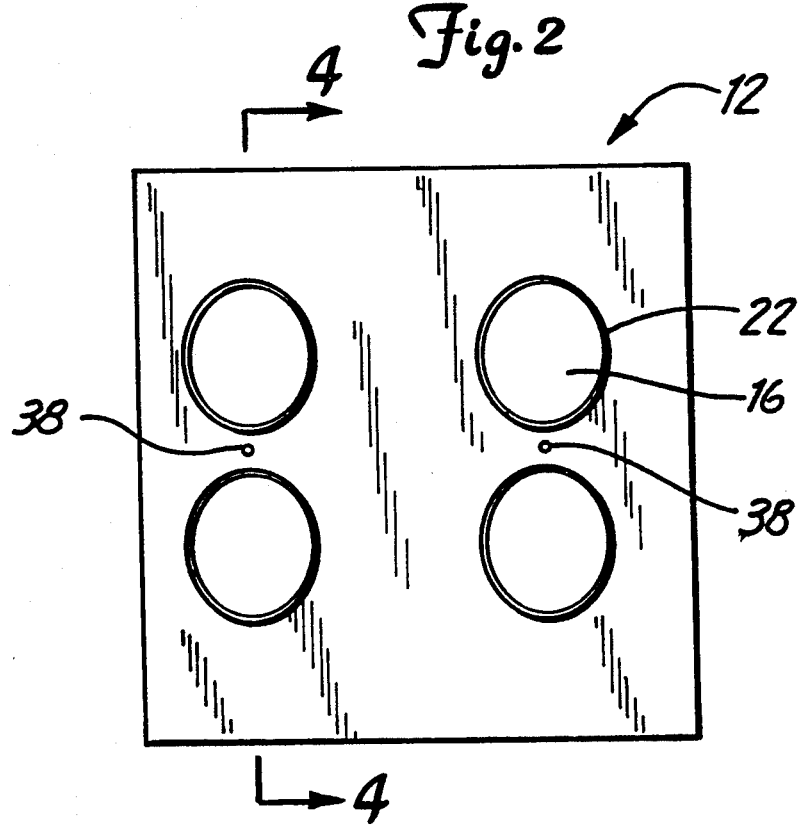
FIG. 2 is a top plan view of a template which forms a part of the embodiment illustrated in FIG. 1.

A top plan view of the template 12 of the present invention is shown in FIG. 2. One feature of this example of the present invention is that the area defined by the cutting ring 22 is larger in each direction than the upper edge 32 of each cavity 18 in the pan 10 (shown in FIG. 3). The extra area allows for snap back in the dough and provides enough dough to cover a shaped surface. If desired, an outer edge of dough extending beyond the upper surface 14 (shown in FIG. 3) of the pan may be formed.

Delivering a cut portion larger than the area defined by the upper pan edge 32 (shown in FIG. 3) allows a portion of the dough to rest upon the frustaconical sidewall 36, forming a baked product having a substantially upwardly extending edge. Similarly, delivering a portion slightly smaller than the upper pan edge 32 but slightly larger than the lower edge 33 would provide an upwardly extending edge. Delivering a portion smaller than the lower pan edge 33 would provide a dough based product with a low profile.

A critical aspect of the present invention is that the shape of the cutting edge and placement of the cutting edge are selected to obtain a dough product of a desired shape. For example, an oval shaped cutting ring having a smaller maximum dimension than the diameter of the lower edge 33 is selected when it is desired to make a pizza crust without a prominent lip. Similarly, if forming a circular shaped deep dish pizza, it is desirable to select an oval shaped cutting ring having a minimum diameter larger than the upper edge 32 of the cavity 18.

Although the sidewall 36 in the illustrated embodiment is responsible for providing a baked product having a more complex geometry than would a pan having no sidewall, the overall shape of the cavity 18 is unimportant to the present invention. For example, the cavity 18 could be square, rectangular, or oval, and may have a contoured lower surface, etc. Additionally, it might be desirable to form a baked product with a raised cone shaped center rather than raised edges. In this case, using a template having a cutting edge which forms and separates a cut portion slightly larger than the area defining the outer edge of the cavity would provide enough dough to adequately cover the cone form, and still deliver a product of the overall desired shape.

The present invention provides means to align the template openings 16 and the pa cavities 18 to accurately deliver the cut portion of the dough to the center of the cavity 18. In a preferred embodiment, the alignment means includes a pair of spaced pins 38 (shown in phantom in FIGS. 1 and 2) extending from a lower surface of the template 12. In the preferred embodiment, the pins 38 are tapered, the larger end being attached to the lower template surface.

The pins 38 are inserted into a pair of spaced apertures 40 in the pan 10, and the template 12 is lowered until the lower surface contacts the upper surface 14 of the pan. Although the illustrated embodiment uses alignment pins and apertures to fix the relative position of the template and pan, the invention contemplates other known means of alignment, such as providing a downwardly projecting edge (not shown) on the outer edges of the template for engaging the outer edges 45 of the pan. The pan may also be aligned with the template by means of a pair of substantially vertical bars which pass through aligned holes in the pan and template. Such holes may be located along the outer edges of the pan and template. The pins may also be mounted onto the upper surface of the pan, and there may also be more than two pins.

The pan 10 of the illustrated embodiment has four cavities 18, each having a lower surface 34 and a sidewall 36. The shape of the sidewall 36 in the typical embodiment is frustaconical. In another embodiment, the shape of the sidewall is cylindrical.

Figure 3:
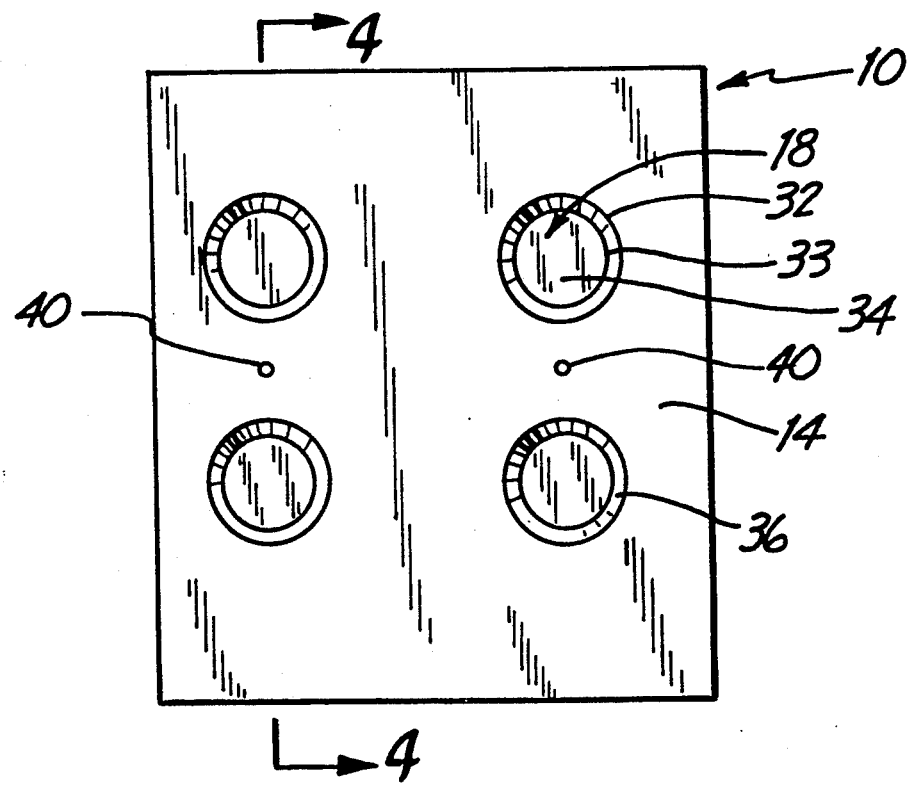
FIG. 3 is a top plan view of a pan which forms a part of the embodiment illustrated in FIG. 1.

A cross-sectional view of the template 12 mounted on the pan 10 as taken along lines 4—4 in FIGS. 2 and 3 is shown in FIG. 4. As can be seen from the drawing, a portion of the upper surface 14 of the pan 10 is visible from each opening 16 in the template.

The pan 10 and template 12 of a preferred embodiment is constructed to travel, during cutting, along a conveyor at a generally fixed rate of speed and to be cut from the leading edge to the trailing edge. For this reason, it is necessary to place the center of the opening 16 in the template slightly upstream (e.g. in the direction of travel of the conveyor as shown by arrow 28) from the center of the cavity 18. The offset is necessary to account for placement error due to the fact that the leading edge of the cutting edge contacts the cutting roller before the trailing edge, and to compensate for the distance that the dough drops, the distance being between the cutting edge and the lower surface of the pan. The snap back effect is greater on the leading (first cut) edge. If a press is used to form the cut portions, and the entire cutting edge is contacted at the same time, no offset is necessary.

In a preferred embodiment, the cutting ring 22 has a height as measured from the upper surface 24 of the template of about $\frac{1}{4}$ inch. The cutting edge 26 is preferably bevelled, and the uppermost portion is substantially planar.

A cross-sectional view of a second preferred embodiment of the present invention is shown in FIG. 5. In this embodiment, the cutting ring 46 is welded onto the upper surface 48 of the pan 50. As with the first preferred embodiment, the cutting ring 46 completely surrounds the upper edge 52 of the cavity 54. The sidewall 57 in this embodiment is substantially cylindrical, but only for the purpose of illustrating that sidewall configuration.

Although it is slightly more difficult to remove cooked dough from the pan 50, the second preferred embodiment has the advantage of eliminating any alignment problems due to excess clearance between alignment pins and corresponding openings, for example. However, such a pan is less flexible for practical purposes. If the consistency of the dough formula is changed, and a different offset is required, it would be necessary to construct new pans as well as new templates. Similarly, if the specified height of the lip changes, the template size must also be changed.

Figure 6:
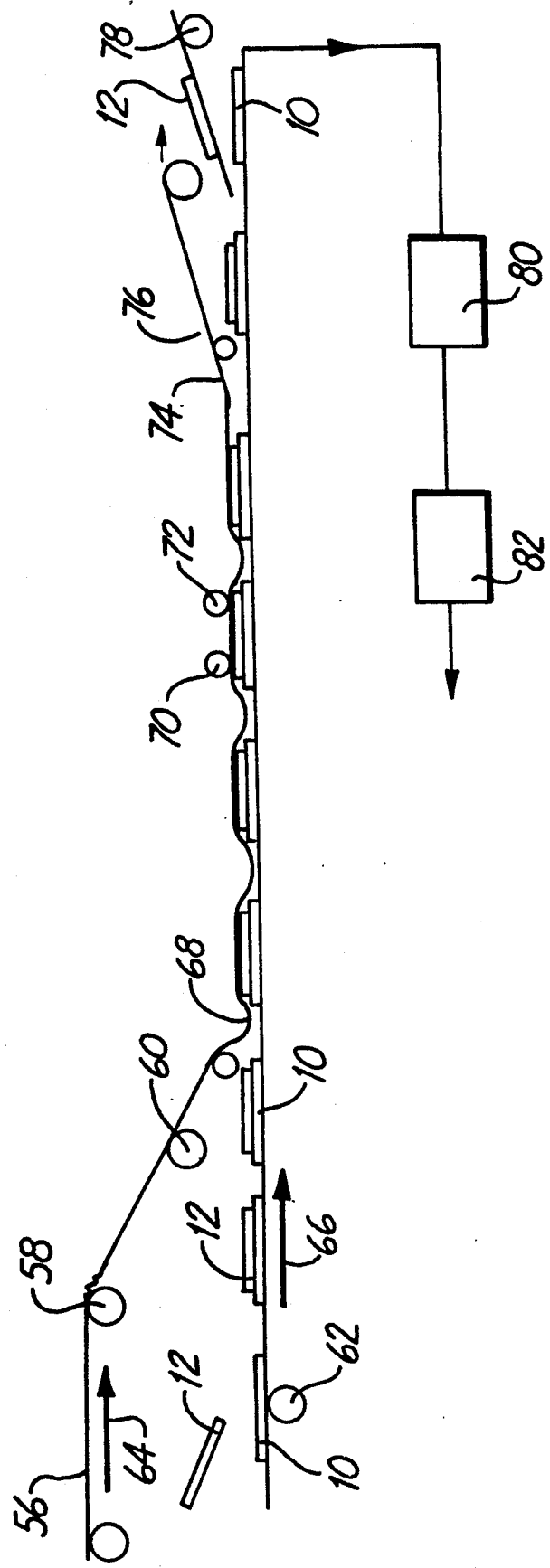
FIG. 6 is a schematic diagram illustrating the preferred method of the present invention.

The use of the pan and template of the present invention may best be understood by a description of a method for using the pan and template to form pizza crusts by a continuous process. The preferred method of the present invention is illustrated in a process flow diagram shown in FIG. 6. FIG. 6 is an example showing a method of cutting a continuous sheet of pizza dough, and placing the cut portions of dough in a pan for further processing steps. Although this example illustrates a method of processing pizza dough, the present invention is not limited to processing pizza dough. For example, the method illustrated in FIG. 1 can be used to form pie crusts.

A quantity of dough is mixed and flattened into a continuous sheet 56. Although the width of the sheet is not critical to the present invention, the width of the preferred continuous sheet 56 is about 36 inches. The sheet 56 is fed onto a horizontal conveyor 58 which in turn feeds the sheet 56 onto a declining conveyor 60. The declining conveyor 60 serves two purposes. First, the declining conveyor 60 delivers the continuous sheet 56 to a lower level, near a pan conveyor 62. Second, the declining conveyor 60 reduces the tension present in the continuous sheet 56 in the direction of travel of the conveyor, as indicated by arrow 64, by moving slightly slower than the horizontal conveyor. Tension is removed from the sheet 56 at a point where the horizontal conveyor 58 meets the declining conveyor 60.

The pan conveyor 62 travels in a direction indicated by arrow 66. The preferred method includes placing a number of pans 10, each having four cavities 18 (shown in FIG. 1) onto the pan conveyor 62. The pan conveyor 62 moves at about the same speed as the speed of the declining conveyor 60. At the point where the dough contacts the pan surface, the tension in the dough is minimized.

A template 12 (shown in FIG. 1) is placed onto the upper surface 14 of the pan (shown in FIG. 1). The two alignment pins 38 on the lower surface of the template (shown in phantom in FIG. 1) register with a pair of openings 40 in the pan 10. The lower surface of the template 14 engages the upper surface 14 of the pan in the preferred method.

The pins 38 and openings 40 according to the preferred method are aligned to compensate for the fact that the pan conveyor 62 is moving, and also to compensate for the distance the cut portion falls, e.g. the distance between the cutting edge and the base of the pan. The relative position of the template 12 and the pan 10 is selected such that the cut portion remains centered as it drops into the cavity 18 of the pan.

The template 12 and pan 10 together pass under the declining conveyor 60 and the upper surfaces are draped at 68 with the dough sheet 56. The sheet 56, when draped is in a reduced state of tension. The draped template 12 and pan 10 next pass beneath a series of cutting rollers 70 and 72 positioned a distance above the conveyor of approximately the combined height of the pan 10 and template 12. The outer surfaces of the cutting rollers 70 and 72 apply a downward force to the upper surface of the sheet 56, causing the upwardly extending cutting edges 26 of the template 12 (shown in FIG. 1) to sever the sheet 56, forming a continuous sheet of scrap 74, and forming a plurality of cut portions (not shown). As the cut portions drop, they are positioned centrally in each cavity 18 of the pan 10 (shown in FIG. 1).

Although the preferred method employs the use of two cutting rollers 70 and 72 for sequentially cutting the sheet of dough 56, any number of cutting rollers may be used to practice this method. Alternatively, a die which travels downward onto the cutting edge 26 would also adequately sever the cut portions from the sheet. In this latter case, an offset between template and pan cavity is not required. Any means for providing a force having a force element substantially normal to the surface of the pan 10 is contemplated by this invention.

The sheet of scrap 74 according to the preferred method is conveniently lifted off the upper surface of the pan and template by means of a lift conveyor 76 and is conveyed to a recycling hopper (not shown) which eventually combines the scrap dough with fresh dough.

The preferred method includes the next step of lifting the templates 12 off of the pans 10 with a lift conveyor 78. The lift conveyor 78 is inclined and carries the used templates into an area where the templates are manually lifted off of the conveyor 78, stacked in carts, and wheeled back to the beginning of the production line.

Although the templates 12 are handled manually according to the described method, the present method contemplates automated placement of the templates 12 onto another conveyor for delivering the templates back to the beginning of the line (not shown).

Another preferred embodiment of the method of the present invention contemplates mounting the templates 12 onto one conveyor, with the cutting edges 26 (shown in FIG. 1) facing downwardly. The pans 10 are positioned on a second conveyor. The sheet of dough passes between pan and the cutting edges. A registering device such as a pair of electronic eyes register the template with the pans, and cut the sheet of dough in the desired manner. The present invention also contemplates mounting the templates 12 onto a continuous conveyor with the cutting edges facing upwardly.

After the cut portions are separated into the cavities of the pan according to the method of the present invention, the dough may be proofed 80. Proofing is accomplished in a proofer which maintains an elevated temperature such as about 95 degrees Fahrenheit at a relatively high humidity, such as about 90 percent. Proofing conditions are largely dependent upon the leavening and/or yeast system used to form the dough, the amount of gas generated in the dough during heating, and desired product attributes.

Alternatively, the cut portions are not proofed, but are fed directly into a cooker 82 for either partial or full cooking. Although not a part of the present method, the dough may be cooked by frying in hot oil, by steaming, baking, or heating by any conventional method known in the art.

Although the present method may be used successfully with leavened doughs such as bread and pizza dough with elastic properties, the present method may also be used to process other doughs such as cookie dough, pastry dough such as pie crust dough, and other types of doughs. The present method may be used to process any dough which is capable of being formed into a sheet.

The method of the present invention is very suitable for processing pizza dough. In particular, it is very suitable for processing dough having a range of about 700 to about 1200 Brabender Units (B.U.). It is most suitable for doughs between about 750 and about 1150 B.U. As is known in the art, as the B.U. values increase, dough stiffness and dryness increases.

Dough having between about 30 and about 70 pounds of water per about 100 pounds of flour are especially suitable doughs for sheet forming. Bread type pizza dough ranges between about 50 and about 70 pounds of water per 100 pounds of flour. Cracker type dough typically has about 30 pounds of water per 100 pounds of flour, and high fat doughs and biscuit type doughs range between about 30 and about 60 pounds water per 100 pounds of flour.

The most preferred dough for use with the present method is a bread type pizza dough having a preferred formulation of between about 50 and about 65 pounds water per 100 pounds of flour.

Doughs outside the stated B.U. and formulation ranges, as mentioned above, are also suitable for processing according to the present method. The only requirement is that the dough have a structure capable of being formed into a sheet.

The preferred sheet thickness for forming a pizza crust is between about ⅛ inch and about ¾ inch. The most preferred sheet thickness is about ¼ inch thick for forming a thick crust pizza. Sheet thicknesses outside this range are suitable for products other than pizza crusts.

The method of the present invention is suitable for elastic doughs because the method requires very little handling. Doughs such as pizza doughs are sensitive to handling, especially after proofing. That is, too much handling destroys the shape or disrupts the geometry of the dough piece.

Although the present invention has been described with reference to preferred embodiments, workers skilled in the art will recognize that changes may be made in form and detail without departing from the spirit and scope of the invention.

What is claimed is:

1. A method of cutting a moving sheet of dough and positioning the cut dough in a moving pan without the aid of a diaphragm, the pan having at least one dough receiving surface, the method comprising:
   providing at least one moving pan;
   positioning a continuous cutting ring having at least one cutting edge above the dough receiving surface, the cutting ring being stationary in relation to the pan;
   placing the moving sheet of dough over at least one dough receiving surface; and
   cutting the dough with the cutting edge of the continuous cutting ring, such that the dough positioned within each cutting edge forms a cut dough portion which is delivered to and conforms to a shape of the dough receiving surface by means of gravity and without the aid of a diaphragm.

2. The method of claim 1 wherein the pan further comprises an upper surface surrounding the dough receiving surface.

3. The method of claim 2 wherein the step of positioning a cutting ring comprises inserting a pair of spaced pins attached to and extending from a lower surface of a web surrounding the cutting ring into a pair of spaced apertures in the upper surface of the pan, a lower surface of the web contacting the upper surface of the pan.

4. The method of claim 1 wherein the dough is placed over the cutting ring and an upper surface of the pan.

5. The method of claim 1 wherein the dough is moved by means of a conveyor.

6. The method of claim 1 wherein the dough is between about 700 and about 1200 Brabender units.

7. The method of claim 1 wherein the dough is pizza dough.

8. The method of claim 1 wherein the dough has an elastic characteristic.

9. The method of claim 1 and further comprising the step of removing a sheet of scrap dough by means of a conveyor after the dough is cut.

10. The method of claim 1 wherein the step of cutting the dough with the cutting edge comprises the step of passing the sheet under a cutting roller.

11. The method of claim 1 wherein the dough receiving surface includes at least one shaped cavity, and a point central to an area defined by the cutting edge is directly above a point central to a selected cavity.

12. The method of claim 1 wherein the dough receiving surface includes at least one shaped cavity, and a point central to an area defined by the cutting edge is offset from a point central to a selected cavity.

13. The method of claim 1 wherein the pan is moved by means of a conveyor.

14. A method of cutting a moving sheet of dough and positioning the cut dough in a moving pan without the use of a diaphragm, the pan having at least one dough receiving surface, the method comprising:
   providing at least one moving pan having a dough receiving surface and a cutting ring having at least one cutting edge located above the dough receiving surface, the cutting ring being fixedly attached to the moving pan and surrounding the dough receiving surface;
   positioning the moving sheet of dough over the cutting edge and dough receiving surface; and
   cutting the dough with the cutting edge, such that the dough positioned within each cutting edge forms a cut dough portion which is delivered to and conforms to a shape of the dough receiving surface without the aid of a diaphragm and by means of gravity.

15. The method of claim 14 wherein the dough is pizza dough.

* * * * *